United States Patent Office 3,457,274
Patented July 22, 1969

3,457,274
HEXAHYDRO-ISOINDOLINONE LACTONES
Geoffrey Lightfoot Floyd Norris, Roy Neville Speake, and William Brian Turner, Macclesfield, England, assignors to Imperial Chemical Industries Limited, London, England, a corporation of Great Britain
No Drawing. Continuation-in-part of application Ser. No. 429,615, Feb. 1, 1965. This application June 12, 1967, Ser. No. 645,513
Claims priority, application Great Britain, Feb. 14, 1964, 6,269/64
Int. Cl. C07d 27/30, 9/00; A01n 9/22
U.S. Cl. 260—325                     3 Claims

ABSTRACT OF THE DISCLOSURE

The disclosure relates to the two antibiotic products 1-benzyl - 4 - (10'-carboxy - 4' - methyl-8'-oxodeca-1',9-dienyl) - 3a,4,5,6,7,7a - hexahydro - 3a,5 - dihydroxy-7-methyl-6-methyleneisoindoline-3-one 10'→3a-lactone and 1-benzyl - 4 - (10'-carboxy-8'-hydroxy - 4' - methyldeca-1',9'-dienyl) - 3a,4,5,6,7,7a - hexahydro - 3a,5 - dihydroxy-7-methyl - 6 - methyleneisoindoline-3-one 10'→3a-lactone and to a fermentation process for obtaining the said compounds. The compounds possess antifungal activity and profound effects on tissue culture cells.

---

This application is a continuation-in-part of Ser. No. 429,615 filed Feb. 1, 1965.

This invention relates to novel antibiotic products which possess antifungal properties and which produce effects on tissue culture cells.

According to the invention we provide the novel antibiotic products which have the formula:

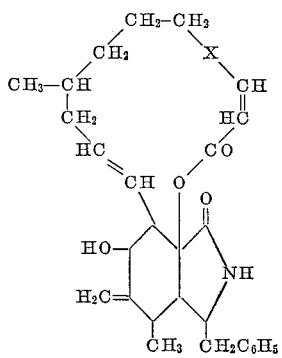

wherein X stands for the carbonyl (—CO—) or hydroxymethylene (—CHOH—) radical.

The compound wherein X stands for the carbonyl radical is hereinafter referred to as MM.18. It is also known as cytochalasin A, and its systematic name is 1-benzyl - 4 - (10'carboxy - 4' - methyl - 8' - oxodeca-1',9'-dienyl) - 3a,4,5,6,7,7a - hexahydro - 3a,5 - dihydroxy-7-methyl-6-methyleneisoindoline-3-one 10'→3a-lactone. The compound MM.18 has a molecular formula of $C_{29}H_{35}NO_5$ and has a variable melting point, usually 182–185° C., but sometimes as high as 189–192° C. It has a constant and characteristic infra-red absorption spectrum which shows $\nu$ max. (liquid paraffin): 3350(s.), 3210(m.), 3140(w.), 3060(vw.), 1714(vs.), 1692(s.), 1623(w.) cm.$^{-1}$ and $\nu$ max. (bromoform): 3570(w.), 3410(w.), 3040(w.), 3020(sh.), 1717(s.), 1695(m.), 1625(w.) cm.$^{-1}$. It reacts with acetic anhydride in the presence of pyridine and forms a mono-acetate of melting point 176–181° C.

The compound wherein X stands for the hydroxymethylene radical is hereinafter referred to as MM.22. It is also known as cytochalasin B, and its systematic name is 1-benzyl-4-(10'-carboxy-8'-hydroxy - 4' - methyldeca-1',9'-dienyl) - 3a,4,5,6,7,7a - hexahydro - 3a,5 - dihydroxy - 7 - methyl-6-methyleneisoindoline-3-one 10'→3a-lactone. The compound MM.22 has a molecular formula of $C_{29}H_{37}NO_5$ and has a melting point of 218–221° C. Its infra-red absorption spectrum shows $\nu$ max. (liquid paraffin): 3510(w.), 3380(s.), 3225(w.), 3155(w.), 3100(w.), 3030(vw.), 1715(vs.), 1692(vs.), 1638(w.), 1605(w.) cm.$^{-1}$ and $\nu$ max. (bromoform): 3520, 3410, 3300, 1712(s.) cm.$^{-1}$.

According to a further feature of the invention we provide a process for the manufacture of the antibiotic products MM.18 and MM.22 which comprises cultivation of an active strain of the organism Helminthosporium dematioideum in an aqueous nutrient medium followed by isolation of the desired products from the culture filtrate.

As a suitable strain of organism to be used in the above process there may be mentioned, for example, Helminthosporium dematioideum originating from the Commonwealth Mycological Institute located at Kew, England, and identified as IMI 74812.

The aqueous nutrient medium contains a source of assimilable carbon and a source of assimilable nitrogen. Suitable assimilable sources of carbon may be, for example, a polyhydric alcohol, for example sucrose, glucose or glycerol; a source of polymerised carbohydrate, for example starch; or naturally-occurring or synthetic oils and fats. The carbon source is generally present in the medium within the range of about 0.1–30% by weight and preferably within the range of about 3–8% by weight. Suitable assimilable sources of nitrogen may be an inorganic source or an organic source. It may conveniently be provided initially in the form of, for example, a nitrate of an alkali metal or an alkaline earth metal, or an ammonium salt of an inorganic acid or an organic acid, for example sodium, potassium, calcium or ammonium nitrate or ammonium tartrate, ammonium sulphate or ammonium phosphate. It may also be an amino-acid, for example glycine; a seed meal, for example cottonseed meal; or corn steep liquor, peptone, urea, yeast extract or meat extracts. The nitrogen source is generally present in the medium in an amount such that there is present between about 0.001% and about 1.0%, and preferably between 0.01 and 0.50%, of elementary nitrogen in the medium. The medium usually contains smaller quantities of essential elements such as phosphorus (potassium dihydrogen phosphate or di-ammonium hydrogen phosphate), magnesium (magnesium sulphate or magnesium carbonate), sulphur (a sulphate) and potassium (potassium chloride or potassium carbonate) and minute quantities of so-called trace elements such as iron, manganese, zinc, molybdenum or copper.

As suitable aqueous nutrient media there may be mentioned, for example, (i) an aqueous medium containing 7.0% glucose, 0.266% tartaric acid, 0.266% ammonium tartrate, 0.04% ammonium phosphate, 0.04% potassium carbonate, 0.027% magnesium carbonate, 0.016% ammonium sulphate, 0.0042% zinc sulphate and 0.0042% ferrous sulphate; (ii) an aqueous medium containing 3.0% glucose, 0.25% bactotryptone, 0.1% potassium dihydrogen phosphate, 0.05% magnesium sulphate and 0.05% potassium chloride and (iii) an aqueous medium containing 5.0% glucose, 0.2% sodium nitrate, 0.1% potassium dihydrogen phosphate, 0.05% magnesium sulphate and 0.001% ferrous sulphate; the media (ii) and (iii) also containing minute quantities of trace elements such as iron, manganese, zinc, molybdenum or copper.

The cultivation of the organism may be carried out within the temperature range of 15–35° C., preferably at a temperature of about 24° C., and growth of the organism is generally complete after about 13–15 days.

The desired antiobiotic products MM.18 and MM.22 are present in the culture filtrate and may be isolated by filtration of the culture medium followed by extraction of the culture filtrate with an organic solvent such as chloroform, thereby providing a solution of the mixed products. Further separation and purification may be carried out by means of chromatography using an absorption column of silica gel or alumina and elution solvents which are mixtures of chloroform and benzene or mixtures of ethyl acetate and petroleum ether (B.P. 60–80° C.).

According to a further feature of the invention we provide a process for the manufacture of MM.18 which comprises oxidation of MM.22, and a process for the manufacture of MM.22 which comprises reduction of MM.18.

The said oxidation may conveniently be carried out by means of chromium trioxide in the presence of pyridine as a reaction diluent, or by means of manganese dioxide in the presence of chloroform as a diluent. The said reduction may be carried out by use of an equivalent amount of sodium borohydride in the presence of methanol.

The antibiotic product MM.18 possesses antifungal activity, as is shown by the following results:

The antifungal activity of MM.18 against a variety of fungi was measured by a serial dilution assay, following the general procedure described by Brian and Hemming (Annals of Applied Biology, 1945, 32, 214). A standard spore suspension of each organism was prepared as described by Brian and Hemming for *Botrytis allii*. A solution of 200 parts per million (p.p.m.) of MM.18 in Weindling medium (adjusted to pH 3.5) was prepared, and serial dilutions of this in the same medium were prepared as required. Equal quantities of the standard spore suspension and the various MM.18 solutions were mixed and the mixtures were incubated at 25° C. for 16–18 hours.

The minimum concentration of MM.18 which reduced germination of the spores to less than 5% of those of the controls, and the minimum concentration of MM.18 which prevented normal growth of the spores, are recorded for each organism in the table below. At concentrations between the two levels recorded, some germination took place, but morphological changes in the spores were observed.

TABLE

| Organism | Minimum concentration of MM.18 required to reduce germination to less than 5% of the control level (p.p.m.) | Minimum concentration of MM.18 required to prevent normal growth of the organism (p.p.m.) |
| --- | --- | --- |
| *Botrytis allii* | 50 | 0.782 |
| *Penicillium digitatum* | 50 | 0.391 |
| *Thamnidium elegans* | 12.5 | 0.782 |
| *Mucor erectus* | 0.782 | <0.196 |
| *Stemphylium radicinum* | 50 | 1.563 |
| *Penicillium gladioli* | 100 | 6.25 |
| *Penicillium expansum* | 100 | 6.25 |

The antibiotic product MM.18 is therefore useful in the treatment of fungal infestations of plants and animals.

The antibiotic products MM.18 and MM.22 both produce profound effects on cells growing in tissue culture, as shown by the following experiments:

(a) Earle's tissue culture medium was added to an 0.1% weight by volume solution of MM.22 in dimethyl sulphoxide until a mixture containing one part per million of MM.22 was obtained. The above mixture was added to a culture of Earle's "L" strain of mouse fibroblasts growing on glass and the culture was incubated at 37° C. for 24 hours. 95% of the culture cells were then found to contain two nuclei, whereas control cultures incubated under the same conditions without the addition of MM.22 contained only 2% binucleate cells. Observation of the treated cells by time-lapse cinematography showed that the effect was caused by prevention of cytoplasmic cleavage after normal nuclear division.

When exposure of the cells of MM.22 under the above conditions was contained for a number of days, cells containing several nuclei were produced. For example, after an exposure of 7 days the majority of the cells contained between 5 and 8 nuclei, these cells then being sufficiently large to be easily visible by the naked eye.

MM.18 at a concentration of one part per million produced similar effects to MM.22 under the above conditions.

(b) A culture of Earle's "L" strain of mouse fibroblasts growing on glass was treated as described under (a) above with a mixture containing one part per million of MM.22, and the cells were observed by time-lapse cinematography. The motility of the cells and ruffing of the cell margins ceased as soon as the compound was added. The culture chamber was then perfused with normal medium until substantially all the MM.22 had been removed. Ruffling of cell margins and cell movement was resumed, the cells showing no apparent permanent damage.

MM.18 produced similar effects to MM.22 under similar conditions.

(c) A culture of Earle's "L" strain of mouse fibroblasts growing on glass was treated as described under (a) above with a mixture, prepared in similar manner to that described under (a) above, containing ten parts per million of MM.22. After a few minutes, between 80 and 90% of the cells were observed to have a prominent bulge in the region of the nucleus. The bulge rapidly became pinched off so that the nucleus lay entirely outside the cell and was joined to the cell by a narrow neck. In some cases the neck became elongated to form a thread which was easily ruptured, leading to complete enucleation of the cell.

The process of nuclear extrusion was reversible in its early stages if the culture chamber was perfused with normal medium in order to remove the MM.22.

MM.18 produced similar effects to MM.22 under similar conditions.

The antibiotics MM.18 and MM.22 are therefore useful as tools in the study of cytological processes with which they interfere, in particular the study of the process of cytoplasmic cleavage and of cell movement. The compounds are also useful in studying the interdependence of cell nucleus and cytoplasma, by virtue of the ability of the compounds to cause enucleation of cells.

The toxicity of the antibiotic products MM.18 and MM.22 to living animals was examined as follows:

A single oral dose of 125 mg./kg. body weight of MM.18 had no effect on three mice, but a single oral dose of 250 mg./kg. body weight killed two out of three mice. No histological changes could be detected in the tissues of the mice killed in this way.

Daily oral doses of 250 mg./kg. body weight of MM.22 for seven days were not lethal to mice. No histological changes could be detected in animals sacrificed after 2, 4 or 7 days of such treatment.

The invention is illustrated but not limited by the following examples:

Example 1

An aqueous nutrient medium is made up containing the following ingredients:

| | Percent, w./v. |
|---|---|
| Tartaric acid | 0.266 |
| Mono-ammonium tartrate | 0.266 |
| Di-ammonium hydrogen phosphate | 0.04 |
| Potassium carbonate | 0.04 |
| Magnesium carbonate [$3MgCO_3 \cdot Mg(OH)_2 \cdot 3H_2O$] | 0.027 |
| Ammonium sulphate | 0.016 |
| Zinc sulphate heptahydrate | 0.0042 |
| Ferrous sulphate heptahydrate | 0.0042 |
| Dextrolact | 2.5 |
| Yeast extract ("Difco" brand) | 0.01 |

This medium is placed in ceramic fermentation vessels (each one containing 1 litre of medium) and aqueous 5 N potassium hydroxide solution is added to the medium to adjust it to a pH of 6.0. The medium is sterilised by autoclaving and the pH is then 5.5. This medium is inoculated with 2 ml. of an inoculum of *Helminthosporium dematioideum* (IMI 74812) previously grown in a bottle slant on potato dextrose agar for 14 days.

The fermentation is carried out at a temperature of 24° C. for 13–15 days. The medium is then filtered and the culture filtrate (33 litres), which has a pH of 7.6, is extracted twice with chloroform using 3.3 litres each time. Subsequent stages in the purification procedure are carried out in brown glassware to protect the MM.18 which is sensitive to light. The chloroform solution is evaporated in vacuo and the colourless solid residue (6.04 gm.) is dissolved in acetone (25 ml.) and added to silica gel (30 gm.). The mixture is stirred and heated to remove the acetone and the resulting dry silica gel is then placed on top of a column (diameter=35 cm.) of silica gel (130 gm.) made up in benzene/chloroform (9:1 v./v.). The column is eluted with benzene/chloroform (9:1 v./v.) followed by benzene/chloroform (4:1 v./v.) as solvents. The small amounts of gums so obtained are discarded. Elution with benzene/chloroform (1:1 v./v.) as solvent gives fractions containing a mixture of colourless gum and solid (488 mg.). This material is crystallised from acetone/petroleum ether (B.P. 60–80° C.) and there is obtained a product, M.P. 178–185° C. The latter is then crystallised twice further from acetone/petroleum ether (B.P. 60–80° C.) and there is thus obtained a colourless crystalline solid (MM.18), M.P. 182–185° C. When a sample is subjected to elementary analysis, it is found to have C, 72.75, 72.85, 73.0%; H, 7.3, 7.3, 7.4%; N, 3.0, 3.1, 3.1%. There is no halogen, sulphur, methoxy group or acetoxy group present in the molecule. The molecular weight found (X-ray method) is 472±10. The molecular formula $C_{29}H_{35}NO_5$ requires C, 72.9%; H, 7.4%; N, 2.9% and a molecular weight of 478.

MM.18 forms a mono-acetate, M.P. 176–181° C. from interaction of MM.18 and acetic anhydride in the presence of pyridine. Elementary analysis shows C, 71.6, 71.7%; H, 7.3, 7.4%; acetoxy group 9.2%. The molecular formula $C_{31}H_{37}NO_6$ requires C, 71.56%; H, 7.2%; acetoxy group 9.2%. Its infra-red absorption spectrum shows $\nu$ max. (liquid paraffin): 3195(s.), 3095(s.), 1732(vs.), 1703(vs.), 1623(s.) cm.$^{-1}$ and $\nu$ max. (bromoform): 3380(w.), 3010(w.), 1720 (s.,br.), 1688(s.) and 1615(w.) cm.$^{-1}$.

The column above is further eluted with benzene/chloroform (1:1 v./v.) as solvent followed by chloroform alone as solvent. The first fractions obtained are mixtures, M.P. 170–210° C. and then there is obtained a colourless solid (2.69 gm.) which is finally crystallized from acetone. There is thus obtained a colourless crystalline solid (1.61 gm.) which is MM.22, M.P. 218–221° C. Elementary analysis shows C, 72.75, 72.9, 72.5%; H, 7.9, 7.9, 8.0%; N, 3.0% and no halogen, sulphur, methoxy group or acetoxy group present in the molecule. The molecular formula $C_{29}H_{37}NO_5$ requires C, 72.6%; H, 7.8%; N, 2.9%.

Example 2

The product MM.22 (100 mg.) is added to a solution of chromium trioxide (40 mg.) in pyridine (4 ml.) and the reaction mixture is kept at 18–22° C. for 18 hours. It is then poured into water and the aqueous mixture is extracted with ethyl acetate. The ethyl acetate extract is thoroughly washed with water, dried over sodium sulphate and the solvent is then removed in vacuo. The residual gum is purified by chromatography on silica gel using chloroform/benzene mixtures. The early eluates are evaporated to dryness in vacuo. The material so obtained is crystallised from acetone/petroleum ether (60–80° C.) and there is thus obtained a product, M.P. 182–185° C. which is identical with an authentic sample of MM.18 as shown by comparison of infra-red spectra.

Example 3

MM.22 (48 mg.) is dissolved in chloroform (10 ml.), manganese dioxide (200 mg.) is added, and the mixture is stirred for 3 days in a brown flask. The manganese dioxide is then removed by filtration through celite and the filtrate is evaporated thus providing a white solid. This solid is subjected to chromatographic purification on silica gel using chloroform/benzene mixtures and the early fractions are evaporated. There is thus obtained a solid which crystallises from acetone/light petroleum (B.P. 60–80° C.) as needles, M.P. 182–185° C. which is identical with an authentic sample of MM.18.

Example 4

MM.18 (50 mg.) is dissolved in methanol (3.5 ml.) and is then treated with 1 equivalent of sodium borohydride. After 15 minutes, the solution is acidified with dilute hydrochloric acid and the mixture is extracted with chloroform. The chloroform extract is then evaporated to dryness and the residual solid is subjected to chromatographic purification on silica gel using chloroform/benzene mixtures. Evaporation of the appropriate fractions gives a solid which when crystallised from acetone/light petroleum (B.P. 60–80° C.) has M.P 218–221° C and is identical with an authentic sample of MM.22.

What we claim is:
1. An antibiotic product which has the formula:

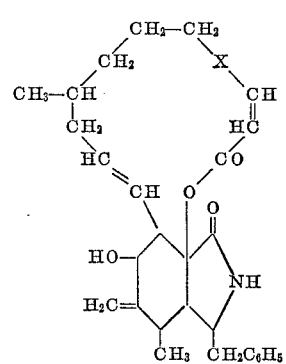

wherein X is selected from carbonyl (—CO—) and hydroxymethylene (—CHOH—).

2. The compound claimed in claim 1 which is 1-benzyl- 4-(10'-carboxy-4'-methyl-8'-oxodeca-1',9'-dienyl) - 3a,4,-5,6,7,7a-hexahydro-3a,5-dihydroxy-7-methyl-6-methylene-isoindoline-3-one 10'→3a-lactone.

3. The compound claimed in claim 1 which is 1-benzyl-4-(10'-carboxy-8'-hydroxy-4'-methyldeca-1',9'-dienyl)-3a,4,5,6,7,7a - hexahydro - 3a,5 - dihydroxy-7-methyl-6-methyleneisoindoline-3-one 10'→3a-lactone.

No references cited.

NICHOLAS S. RIZZO, Primary Examiner

J. A. NARCAVAGE, Assistant Examiner

U.S. Cl. X.R.

195—1.7, 81, 100, 103.5; 424—274